United States Patent
Teboulle et al.

(10) Patent No.: US 11,343,744 B2
(45) Date of Patent: May 24, 2022

(54) METHOD FOR MANAGING HANDOVER ROAMING

(71) Applicant: SAGEMCOM ENERGY & TELECOM SAS, Rueil Malmaison (FR)

(72) Inventors: Henri Teboulle, Rueil Malmaison (FR); Guillaume Moreau, Rueil Malmaison (FR); Franck Harnay, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 187 days.

(21) Appl. No.: 16/567,817

(22) Filed: Sep. 11, 2019

(65) Prior Publication Data
US 2020/0100158 A1 Mar. 26, 2020

(30) Foreign Application Priority Data
Sep. 25, 2018 (FR) ...................... 18/71086

(51) Int. Cl.
*H04W 36/16* (2009.01)
*H04L 12/28* (2006.01)
(Continued)

(52) U.S. Cl.
CPC ....... *H04W 36/165* (2013.01); *H04L 12/2854* (2013.01); *H04L 12/66* (2013.01);
(Continued)

(58) Field of Classification Search
CPC . H04L 12/2854; H04L 12/66; H04L 63/0428; H04L 63/062; H04L 63/0884;
(Continued)

(56) References Cited

U.S. PATENT DOCUMENTS

2018/0124590 A1* 5/2018 O'Connell .............. H04W 8/12

FOREIGN PATENT DOCUMENTS

EP  2568715 A1 * 3/2013 ............ H04W 80/04
EP  3 364 607 A1  8/2018

OTHER PUBLICATIONS

Apr. 10, 2019 Search Report issued in French Patent Application No. 18/71086.
(Continued)

*Primary Examiner* — Zhensheng Zhang
(74) *Attorney, Agent, or Firm* — Oliff PLC; R. Brian Drozd

(57) ABSTRACT

In the context of management of handover roaming, a communication system comprises a first LPWAN network of a first operator and a second LPWAN network of a second operator. The first network comprises gathering gateways, a first server managing the gathering gateways, and a second server controlling the MAC layer. The second network comprises a third server interfacing fourth and fifth servers with the second server. Uplink frames of application data are transported from an end device of the second operator to the fourth server by successive relayings of the first, second and third servers. However, when the end device of the second operator requests joining the communication system in order to benefit from the services of the fourth server, the gathering gateways communicate with the fifth server, short-circuiting the first, second and third servers.

12 Claims, 6 Drawing Sheets

(51) Int. Cl.
*H04L 12/66* (2006.01)
*H04L 29/06* (2006.01)
*H04W 36/14* (2009.01)

(52) U.S. Cl.
CPC ........ *H04L 63/0428* (2013.01); *H04L 63/062* (2013.01); *H04L 63/0884* (2013.01); *H04W 36/14* (2013.01)

(58) Field of Classification Search
CPC ... H04W 36/14; H04W 36/165; H04W 40/22; H04W 40/36
See application file for complete search history.

(56) References Cited

OTHER PUBLICATIONS

Yegin et al.; "LoRaWAN Backend Interfaces 1.0 Specification;" Oct. 11, 2017; https://lora-alliance.org/sites/default/files/2018-04/lorawantm-backend-interfaces-v1.0.pdf; XP055532888.

Farrell et al; "Low-Power Wide Area Network (LPWAN) Overview; rfc8376.txt;" Internet Engineering Task Force, IETF Standard, Internet Society (ISOC); Geneva, Switzerland; Jun. 1, 2018; pp. 1-43; XP015126337.

* cited by examiner

METHOD FOR MANAGING HANDOVER ROAMING

TECHNICAL FIELD

The present invention relates to a method for managing handover roaming in the context of a communication network based on an LPWAN (low-power wide-area network) communication technology.

PRIOR ART

The Internet of Things is emerging. The Internet of Things represents the extension of the internet to things and places in the physical world. Whereas the internet does not normally extend beyond the electronic world, the Internet of Things represents exchanges of information and data coming from devices present in the real world to the internet, such as for example for making a collection of electricity-consumption or water-consumption readings. The Internet of Things is considered to be the third evolution of the internet, referred to as Web 3.0. The Internet of Things is partly responsible for the current increase in the volume of data to be transmitted and stored, and thus gives rise to what is called "Big Data". The Internet of Things has a universal character for designating putting objects in communication for varied uses, for example in the industrial, food, e-health and home-automation field.

To enable communicating objects, also referred to as end devices, to communicate in the context of the Internet of Things, communication systems are established by means of a set of gathering gateways that are situated at geographically high points and are deployed by an operator. Apart from maintenance operations, these gathering gateways are typically fixed and permanent, and communicate with the end devices by radio. Mention can be made for example on this model of the SigFox (registered trade mark) or ThingPark (registered trade mark) networks. These gathering gateways communicate with the end devices by means of medium- or long-range radio communications in accordance with an LPWAN communication technology, such as for example the LoRaWAN (long-range wide-area network) technology, also known by the abbreviation LoRa (long range), from the name of the alliance promoting the LoRaWAN technology. These gathering gateways thus serve as relays between the end devices and a core network, typically consisting of a set of servers, of the communication system.

The end devices are often devices supplied by battery and are therefore intended to go on standby as much as possible in order to increase their battery life. For this purpose, these end devices apply, in their indirect communications with the core network (via one or more gathering gateways), a communication mechanism referred to as Class A in the LoRaWAN protocol. This mechanism consists of defining, deterministically for an end device in question and the gathering gateway that acts as a relay for this core network, one or more reception windows during which the end device in question listens on the communication medium where the downlink communications must be made. One or more reception windows begin at the end of a period of predefined duration according to an instant of transmission of an uplink frame by the end device in question and also have a predefined duration. Two reception windows are thus defined in the case of the LoRaWAN protocol defined in version 1.1 of the specifications of 11 Oct. 2017. A downlink frame that must be addressed to said end device is then effected in one or other (where applicable) of said reception windows, in particular to acknowledge said uplink frame. It is in fact typically necessary for the end device in question to know that the core network has actually received the uplink frame transmitted by said end device. This approach by reception windows beginning at instants deterministic for the end device in question and the gathering gateway that acts as a relay for the server enables said end device to go on standby in the meantime and thus to preserve its power supply. It should be noted that there exists a development of this reception window mechanism, referred to as Class B in the LoRaWAN protocol, which defines reception windows notified in beacons transmitted by the gathering gateways. And, for the end devices that have a longer-lasting power supply, a third mechanism is available, referred to as Class C in the LoRaWAN protocol, in which the end devices are supposed to listen on the communication medium permanently.

It should be noted that an uplink frame or communication is spoken of when a frame or communication is transferred from an end device to the core network, and that a downlink frame or communication is spoken of in the opposite direction.

However, it is not certain that the round-trip time between the gathering gateways and the core network routinely makes it possible to comply with the expected reception deadlines, more particularly for Class A end devices where the downlink communication opportunities are few. This is particularly the case at the moment when the end device joins the communication system, particularly in situations of handover roaming. This situation is illustrated by the exchange of messages shown schematically in FIG. 2 on the basis of a system architecture shown schematically in FIG. 1, in which two networks of two operators interact in order to form the communication system. It is to be distinguished from passive roaming situations where the MAC (medium access control) layer is managed remotely by the core network of the operator with whom a service subscription has been taken out. A main advantage of handover roaming is that the control plane of the MAC layer is managed by the accepting core network, which affords better matching of parameterisings (carrier frequencies, spread factor, etc.) of the end devices vis-à-vis the actual communication conditions with the accepting core network that provides the relay with the core network of the operator with whom the service subscription has been taken out. Compared with passive roaming, this improves the ability to ensure continuity of the services very effectively.

FIG. 1 thus illustrates schematically a communication system of the Internet of Things suited to handover roaming. The communication system comprises a first LPWAN network of a first operator interconnected with a second LPWAN network of a second operator. The first network comprises at least one gathering gateway 120, 121, 122 (denoted GW, standing for gateway, in the Figs.). The gathering gateways 120, 121, 122 have available respective communication links with a core network of the first network of the first operator. Three gathering gateways of the first network are shown in FIG. 1, but the communication system may comprise a different number of gathering gateways. The second network also comprises such gathering gateways, which are however not shown for reasons of simplification.

In the communication system, messages must be transferred in the form of frames from a set of end devices (denoted ED, standing for end device, in the Figs.) to the core network. Although the communication system comprises two networks, and therefore two core networks, the latter are perceived as a single core network by the end devices. In other words, handover roaming is transparent for the end devices. Only one end device 110 is shown in FIG. 1 for reasons of simplification, but the communication system typically comprises a large number of end devices.

Every core network has a role of monitoring and gathering information available from the end devices, and the gathering gateways 120, 121, 122 have a role of relay between the end devices and the core network. To make it possible to fulfil this role of relay, each gathering gateway 120, 121, 122 has at least one radio interface enabling said gathering gateway to communicate with at least one end device by relying on a wireless communication medium, and preferentially according to an LPWAN communication technology. Said radio interface is for example of the LoRa type thus making it possible to implement, in the communication system, a LoRaWAN data transmission protocol. Said radio interface is such that an end device may be within radio range of a plurality of gathering gateways, depending on the geographical position of said end device with respect to the gathering gateways 120, 121, 122 and radio conditions in the environment of said end device and gathering gateways 120, 121, 122. This is the case for example with the end device 110 in FIG. 1, which is within radio range of the gathering gateways 120, 121 and 122. In addition, each gathering gateway 120, 121, 122 has at least one other interface enabling said gathering gateway to communicate with the core network. For example, this other interface is a cabled interface making it possible to communicate with the core network via the internet or a radio interface of the GPRS (General Packet Radio Service) type.

The core network of the first operator is suitable for performing handover roaming in collaboration with the core network of the second network. Thus the core network of the first operator comprises a first FNS server (forward network server) 130 responsible for managing the gathering gateways 120, 121, 122 on behalf of said core network and ensuring in particular the deduplication of the uplink frames received from end devices via said gathering gateways 120, 121, 122. The core network of the first operator further comprises a second SNS server (serving network server) 121 coupled to the first FNS server 130. The second SNS server 131 is responsible for controlling the MAC layer for the end devices communicating via the gathering gateways 120, 121, 122 that are managed by the first FNS server 130. The first FNS server 130 and the second SNS server 131 may be implemented in the same hardware entity.

The core network of the second operator comprises a third HNS server (home network server) 140, which is the server that coordinates the core network of the second operator. This third HNS server 140 is the equivalent in the second network to the second SNS server 131 in the first network. Moreover, the second network typically also comprises a server equivalent to the FNS server 130, coupled to the third HNS server 140, and which manages the gathering gateways of the second network.

The core network of the second operator further comprises a fourth AS server 150, which implements an application with which the end device 110 communicates, i.e. exchanges application data, in the context of the service subscription. The core network of the second operator may comprise a plurality of such fourth AS servers 150. Finally, the core network of the second operator further comprises a fifth JS server 160, responsible for managing the subscriptions of the end devices in order to make the necessary subscription checks to enable them to benefit from the services of the fourth AS server 150 when said end devices seek to join the communication system.

The fourth AS server 150 and the fifth JS server 160 are declared to the third HNS server 140, and are thus connected to the third HNS server 140. The second SNS server 131 communicates with the third HNS server 140, which serves as a relay with the fourth AS server 150 and the fifth JS server 160 in the context of the communications with the end device 110. In other words, the third HNS server 140 is responsible for interfacing the fourth AS server 150 and the fifth JS server 160 with the first network and more particularly with the second SNS server 131.

There do however exist situations where the second SNS server 131 of the first operator communicates directly with the fifth JS server 160 of the second operator, particularly when the second SNS server 131 does not yet know the identity of the third HNS server 140 at the moment when the end device 110 joins the network in roaming by means of the first FNS server 130. In this case, the second SNS server 131 uses an identifier, referred to as JoinEUI in the LoRaWAN 1.1 specifications, which uniquely identifies the fifth JS server 160 and which the end device 110 includes in a message that said end device 110 transmits in order to join the network. The second SNS server 131 then contacts a sixth DNS server (domain name server) responsible for effecting resolutions of domain names. This sixth DNS server (not shown) then supplies to the second SNS server 131 an address for contacting the fifth JS server 160 according to the unique identifier in question. The second SNS server 131 then supplies to the fifth JS server 160 another identifier, referred to as DevEUI in the LoRaWAN 1.1 specifications, which uniquely identifies the end device 110 so that the fifth JS server 160 supplies accordingly the identity of the third HNS server 140 in return, since the same JS server 160 can interact with at least one other server equivalent to the third HNS server 140.

It should be noted that other communication links (not illustrated, for reasons of simplification) between the servers may exist in each of the first and second networks, in particular between the fourth AS server 150 and the fifth JS server 150.

When the end device 110 joins the communication systems in handover roaming, exchanges of messages are made, as illustrated schematically in FIG. 2.

In a step 201, the end device 110 transmits a message JOIN-REQ via its radio interface. This message is referred to as Join-request in the LoRaWAN 1.1 specifications. As indicated previously, this JOIN-REQ message includes a unique identifier of the end device 110 and a unique identifier of the fifth JS server 160. This message JOIN-REQ is captured by at least one gathering gateway 120, 121, 122. We shall consider that this JOIN-REQ message was captured by the gathering gateway 121. The latter then, in a step 202, relays the JOIN-REQ message to the first FNS server 130 to which said gathering gateway 121 is attached. The first FNS server 130 then relays the JOIN-REQ message to the second SNS server 131 in a step 203. The second SNS server 131 detects that the JOIN-REQ message relates to a roaming end device. The second SNS server 131 then relays the JOIN-REQ message to the third HNS server 140, in the form of a message HRS-REQ, in a step 204. This message is referred to as HRStartReq in the LoRaWAN Backend Interfaces 1.0 specifications, which deal with roaming in the context of the LoRaWAN 1.1 specifications. This message HRS-REQ typically contains supplementary information on MAC layer management by the second SNS server 131. Next, in a step 205, the third HNS server 140 relays the JOIN-REQ message, in the form of a message JREQ, to the fifth JS server 160. This message is referred to as JoinReq in the LoRaWAN 1.1 specifications. This JREQ message typically contains some of the supplementary information on MAC layer management contained in the HRS-REQ message. This fifth JS server 160 then carries out authentication of the end device 110 and, in the case of successful authentication, manages the security keys necessary for the end device 110 to communicate in the communication system and to benefit from the services of the fourth AS server 150.

Then feedback is supplied to the roaming end device 110. To do this, the fifth JS server 160 transmits to the third HNS server 140, in a step 206, a message JANS in response to the message JREQ. This message is referred to as JoinAns in the LoRaWAN 1.1 specifications. The message JANS includes a message JOIN-ACC to be relayed to the end device 110, and, in the case where the end device 110 is actually authenticated by the fifth JS server 160, the security keys for ensuring secure exchanges with the end device 110, including, in a form encrypted by a key known to the end device 110, the security key to be used for communicating with the fourth AS server 150. The message JOIN-ACC is referred to as Join-accept in the LoRaWAN 1.1 specifications. The message JANS repeats the security keys enabling the end device 110 to communicate in the communication system, so that the communications of the end device 110 can be managed by the core network of the first operator (with the exception therefore of the security key enabling the end device 110 to communicate with the fourth AS server 150). In a step 207, the third HNS server 140 transmits to the second SNS server 131 a message HRS-ANS in response to the message HRS-REQ, which includes the content of the message JANS as well as service profile information relating to the roaming end device 110. This message is referred to as HRStartAns in the LoRaWAN Backend Interfaces 1.0 specifications. In a step 208, the second SNS server 131 relays to the first FNS server 130 the message JOIN-ACC created by the fifth JS server 160. Then, in a step 209, the first FNS server 130 selects the gathering gateway responsible for relaying the JOIN-ACC message to the end device 110 and makes it track the message JOIN-ACC. We shall consider that the first FNS server 130 to do this selects the gathering gateway 121. Then, in a step 210, the gathering gateway 121 relays said message JOIN-ACC by radio for the attention of the end device 110.

From the above, it is clear that managing handover roaming involves numerous relayings of messages, in particular between the various servers involved. These relayings involve latencies in execution that add to significant processing latencies on the part of the servers, in particular with regard to the fifth JS server 160. These message relayings are then sometimes incompatible with latency deadlines to be complied with, particularly in the case of the aforementioned reception windows, which means that the end devices may have to deal with great difficulties in joining the network, because they do not receive any response from the core network in the allotted time.

It is desirable to overcome these drawbacks of the prior art. It is in particular desirable to increase the chances of the end devices successfully joining the network in the case of handover roaming. It is also desirable to increase the chances for the end devices that the communications will take place within the allotted times. It is also desirable to be able to rely on message formats existing in the LoRaWAN 1.1 specifications.

DISCLOSURE OF THE INVENTION

To this end, a method is proposed for managing handover roaming in a communication system comprising a first LPWAN network of a first operator and a second LPWAN network of a second operator. The first network comprises: gathering gateways, a first server responsible for managing said gathering gateways; and a second server, coupled to the first server, responsible for controlling the MAC layer for end devices communicating via said gathering gateways. The second network comprises: a third server responsible for interfacing a fourth server and a fifth server with the second server of the first network; the fourth server, which implements an application with which at least one end device of the second operator exchanges application data in the context of a defined service subscription with the second operator; and the fifth server, responsible for authenticating any end device seeking to join the communication system in order to benefit from the services of the fourth server. The method is such that the communication system transports uplink frames including application data from said at least one end device of the second operator to the fourth server by successive relayings of the first, second and third servers when said at least one end device of the second operator is authenticated and furthermore said uplink frames are captured by at least one gathering gateway of the first network. In addition, the method is such that each gathering gateway of the first network that has detected an end device of the second operator requesting to join the communication system in order to benefit from the services of the fourth server communicates with the fifth server in order to authenticate said end device of the second operator detected, short-circuiting the first, second and third servers. Thus the chances for the end devices of the second operator to successfully join the communication system in the case of handover roaming are increased through a significant reduction in latency by short-circuiting the first, second and third servers.

According to a particular embodiment, the first network having a range of addresses for all the end devices accessing the communication system via the gathering gateways of the first network, the fifth server manages a predetermined subset of addresses in the range of addresses of the first network and attributes an address from said predetermined subset of addresses to any end device of the second operator that is in handover roaming via the first network and which is authenticated by the fifth server. Thus the addressing of the end devices in the first network remains coherent although the first, second and third servers are short-circuited in order to authenticate the end devices of the second operator.

According to a particular embodiment, the communications with each authenticated end device of the second operator being encrypted, the fifth server supplies the security keys necessary for said encrypted communications and, when a gathering gateway of the first network receives a message from the fifth server indicating that an end device of the second operator has been successfully authenticated and including said security keys, said gathering gateway of the first network relays the security keys to the first server. Thus the encryptions and decipherings of communications can be entrusted to an entity other than the gathering gateway of the first network to which the fifth server has responded.

According to a particular embodiment, the first server relays the security keys to the second server. Thus the encryptions and decipherings of communications can be established at the second server although the first, second and third servers are short-circuited in order to authenticate said end device of the second operator.

According to a particular embodiment, in order to request to join the communication system in order to benefit from the services of the fourth server, each end device of the second operator sends a message including an identifier that uniquely identifies the fifth server, and each gathering gateway of the first network capturing said message determines at which address to contact the fifth server by means of an association previously stored in memory between said identifier and the address for contacting the fifth server. Thus each gathering gateway of the first server can determine in a simple fashion that the fifth server must be directly contacted and how to contact the fifth server.

According to a particular embodiment, on configuration of each gathering gateway of the first network with the identifier that uniquely identifies the fifth server, said gathering gateway of the first network requests a sixth server, responsible for effecting resolutions of domain names, to supply the address for contacting the fifth server by means of said identifier that uniquely identifies the fifth server. Thus each gathering gateway of the first network has anticipated the need to contact the fifth server in order to manage the end devices of the second operator in handover roaming, which reduces accordingly the processing latency at the moment when the end device of the second operator wishes to join the communication system by handover roaming.

According to a particular embodiment, on configuration of the first server with the identifier that uniquely identifies the fifth server, the first server requests a sixth server, responsible for effecting resolutions of domain names, to supply the address for contacting the fifth server by means of said identifier that uniquely identifies the fifth server, and the first server propagates an association of said identifier and said address with each gathering gateway of the first network. Thus the procedure for initialising the gathering gateways of the first network in the context of handover roaming is simple and effective.

According to a particular embodiment, when the fifth server receives a plurality of copies of the same message that emanates from an end device of the second operator and which requests to join the communication system, the fifth server effects a deduplication of data and responds to the first copy in sequence of said message. Thus the management of the parallel transfers of the copies of messages by various gathering gateways of the first network is simple although the first, second and third servers are short-circuited in order to authenticate said end device of the second operator.

According to a particular embodiment, when a gathering gateway of the first network receives a message from the fifth server indicating that an end device of the second operator has been successfully authenticated, said gathering gateway of the first network activates a delegation and notifies the first server accordingly, the delegation comprising the following steps: allocating a buffer to said end device of the second operator and storing therein useful data subsequently received asynchronously via the first server for the attention of said end device of the second operator; acknowledging any uplink frame subsequently received from said end device of the second operator by constructing and transmitting, on behalf of the second server, downlink frames including respective acknowledgements of said uplink frames and, where applicable, including useful data stored in the buffer allocated to said end device of the second operator; and relaying the uplink frame to the first server. In addition, on reception of a downlink frame for the attention of said end device of the second operator, said gathering gateway of the first network places the useful data, supplied in the downlink frame, in the buffer allocated to said end device of the second operator. Thus the chances for the end devices of the second operator for their communications in the communication system to take place in allotted times are increased.

According to a particular embodiment, each gathering gateway of the first network that receives, coming from the first server, an instruction to deactivate the delegation vis-à-vis an end device of the second operator performs the following steps: if the buffer allocated to the end device of the second operator is empty, confirming with the first server that said gathering gateway of the first network has deactivated the delegation vis-à-vis said end device of the second operator; and, if the buffer allocated to said end device of the second operator is not empty, maintaining the delegation until said buffer is emptied by construction and transmission of said downlink frames by said gathering gateway of the first network. Thus deactivation of the delegation takes place simply and coherently.

According to a particular embodiment, each gathering gateway of the first network that has activated the delegation vis-à-vis an end device of the second operator increments a value of a downlink-frame counter as said downlink frames are constructed for the attention of said end device of the second operator and includes, in said downlink frames, the incremented value of the downlink-frame counter, and, when said gathering gateway of the first network deactivates the delegation, said gathering gateway of the first network notifies to the first server an up-to-date value of the downlink frame counter. Thus the counting of the downlink frames takes place transparently for the end device of the second operator in question.

Another subject matter of the invention is a communication system comprising a first LPWAN network of a first operator and a second LPWAN network of a second operator. The first network comprises: gathering gateways; a first server responsible for managing said gathering gateways; and a second server, coupled to the first server, responsible for controlling the MAC layer for end devices communicating via said gathering gateways. The second network comprises: a third server responsible for interfacing a fourth server and a fifth server with the second server of the first network; the fourth server, which implements an application with which at least one end device of the second operator exchanges application data in the context of a service subscription defined with the second operator; and the fifth server, responsible for authenticating any end device seeking to join the communication system in order to benefit from the services of the fourth server. The communication system is arranged, in the context of a management of handover roaming between the first network and the second network, to transport uplink frames including application data from said at least one end device of the second operator to the fourth server by successive relayings of the first, second and third servers when said at least one end device of the second operator is authenticated and furthermore when said uplink frames are captured by at least one gathering gateway of the first network. In addition, each gathering gateway of the first network that has detected an end device of the second operator requesting to join the communication system in order to benefit from the services of the fourth server is arranged to communicate with the fifth server in order to authenticate said end device of the second operator detected, short-circuiting the first, second and third servers.

BRIEF DESCRIPTION OF THE DRAWINGS

The features of the invention mentioned above, as well as others, will emerge more clearly from a reading of the following description of at least one example embodiment, said description being given in relation to the accompanying drawings, among which.

DETAILED DISCLOSURE OF EMBODIMENTS

Figure 1:
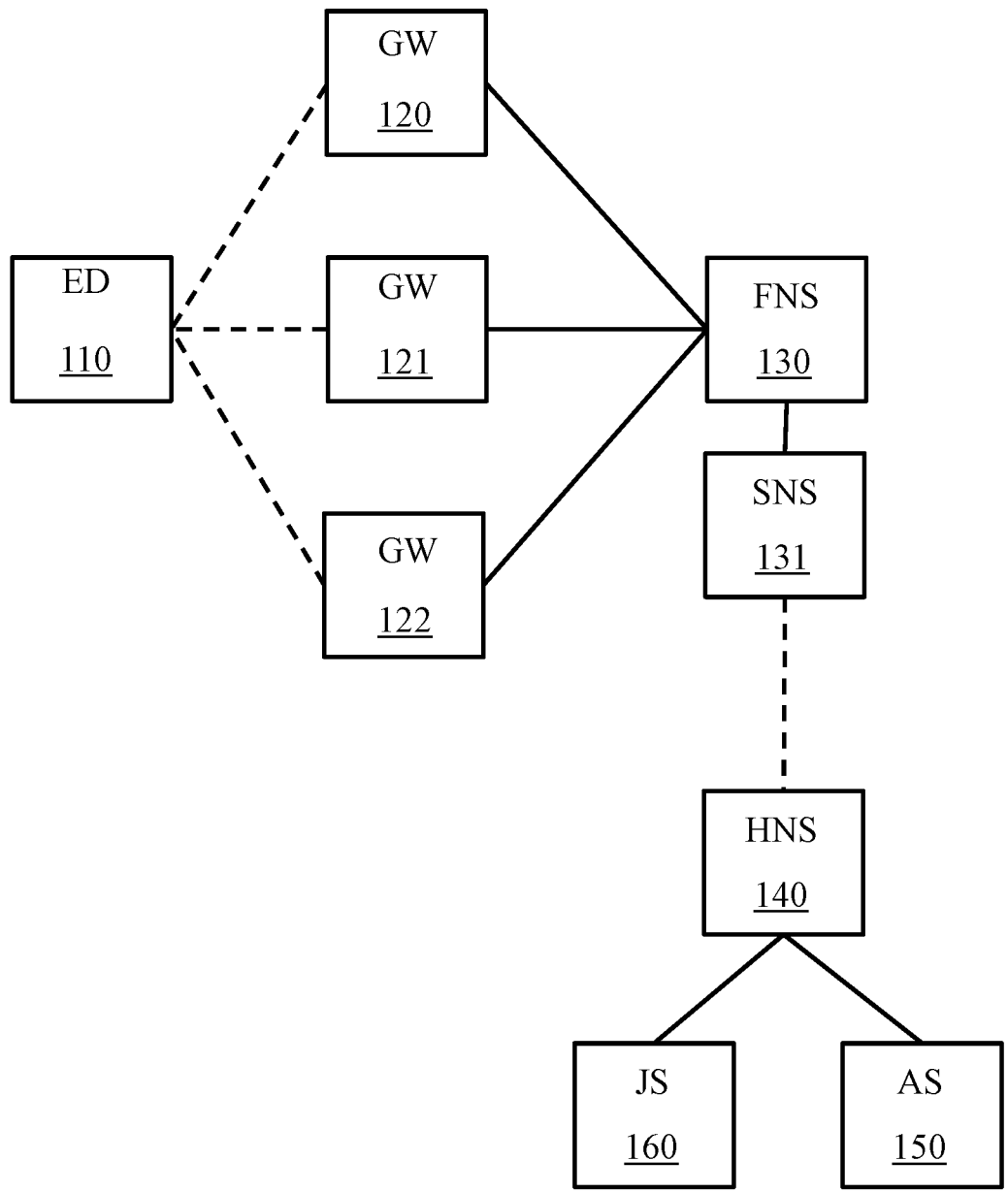
FIG. 1 illustrates schematically a communication system of the Internet of Things according to the prior art.
Figure 3:
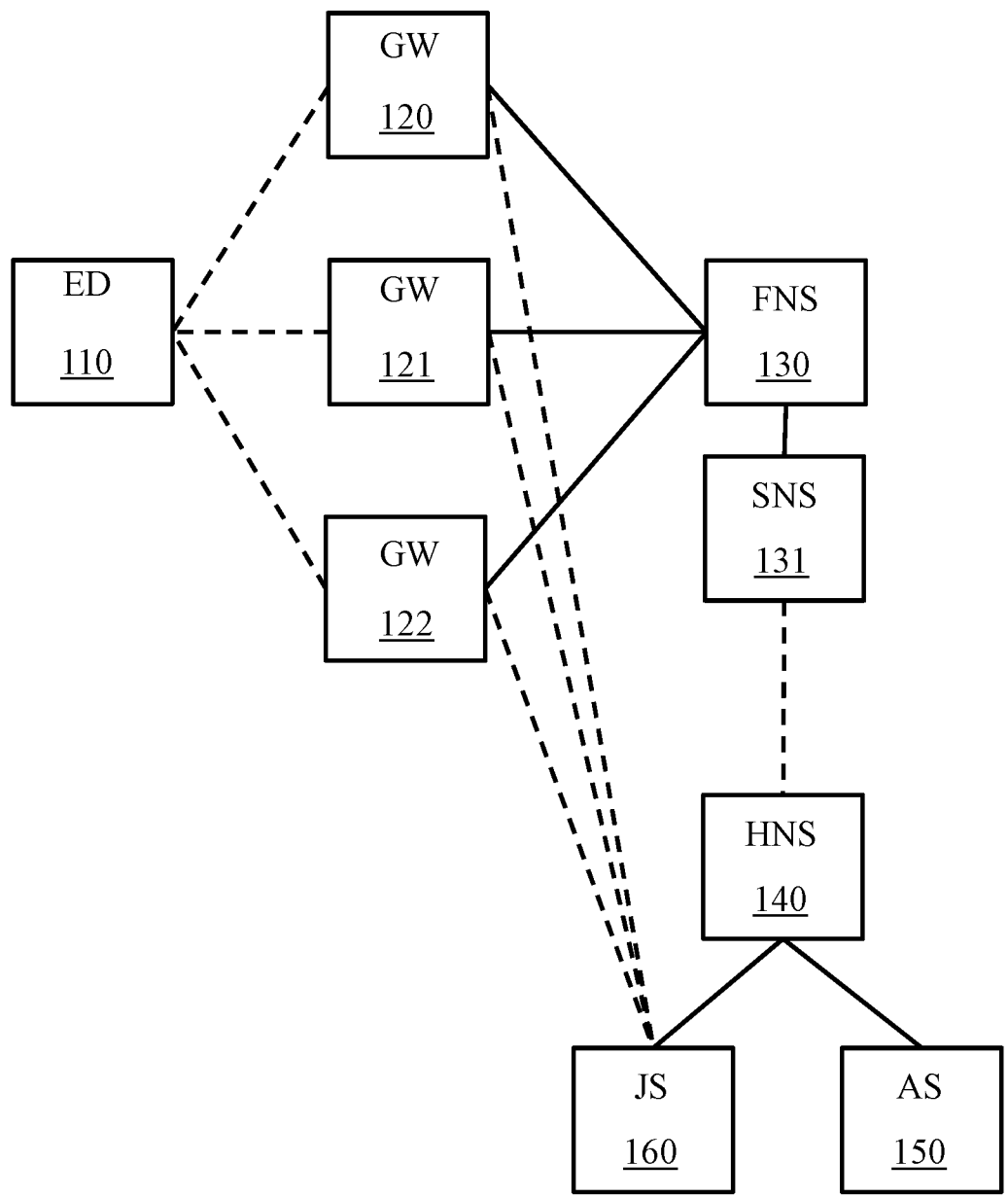
FIG. 3 illustrates schematically a communication system of the Internet of Things in which the present invention can be implemented.

FIG. 3 illustrates schematically a communication system of the Internet of Things in which the present invention can be implemented. The communication system of the Internet of Things of FIG. 3 repeats the communication systems of the Internet of Things of FIG. 1 and adds thereto connections between the gathering gateways 120, 121, 122 of the first network on the one hand and the fifth JS server 160 of the second network on the other hand. The fifth JS server 160 is declared to each of the gathering gateways 120, 121, 122, which are thus connected to the fifth JS server 160. This declaration of the fifth JS server 160 to each of the gathering gateways 120, 121, 122 is made following a roaming agreement concluded between the first operator and the second operator. The same type of communication support can be used between the gathering gateways 120, 121, 122 and the fifth JS server 160 as between the gathering gateways 120, 121, 122 and the first FNS server 130. Another type of communication support may however be used.

As detailed below, this direct relationship between the gathering gateways 120, 121, 122 and the fifth JS server 160 simplifies the exchanges of messages by short-circuiting the first FNS 130, second SNS 131 and third HNS 140 servers, and therefore reduces the latency caused, when the end device 110 joins the communication system by handover roaming.

The declaration of the fifth JS server 160 to each of the gathering gateways 120, 121, 122 consists of supplying the identifier, referred to as JoinEUI in the LoRaWAN 1.1 specifications, which uniquely identifies the fifth JS server 160. For the record, this identifier is included by the end device 110 in the JOIN-REQ message that said end device 110 transmits for joining the communication system, and it is therefore necessary for each gathering gateway that must directly interact with the fifth JS server 160 to know it in advance in order to make the link between the end device 110 in roaming and the fifth JS server 160.

In a particular embodiment, following this declaration, each of the gathering gateways 120, 121, 122 then contacts the sixth DNS server, which supplies to them an address for contacting the fifth JS server 160 according to the unique identifier in question.

In a particular embodiment in a variant, the declaration is such that the unique identifier in question is supplied in association with the address for contacting the fifth JS server 160.

In a particular embodiment, the declaration is first of all made to the first FNS server 130 following the roaming agreement concluded between the first operator and the second operator, and the first FNS server 130 tracks the declaration in question to each of the gathering gateways 120, 121, 122. This simplifies the declaration of the fifth JS server 160. It should be noted that one possibility is that the first FNS server 130 contacts the sixth DNS server, which supplies to it the address for contacting the fifth JS server 160 according to the unique identifier in question, and that the first FNS server 130 then transmits to each of the gathering gateways 120, 121, 122 the unique identifier in question in association with the address for contacting the fifth JS server 160.

It should be noted that the communications between the gathering gateways and any server, and between the servers themselves, are preferentially based on the IP protocol (Internet Protocol), as defined in the normative document RFC 791.

Figure 4:
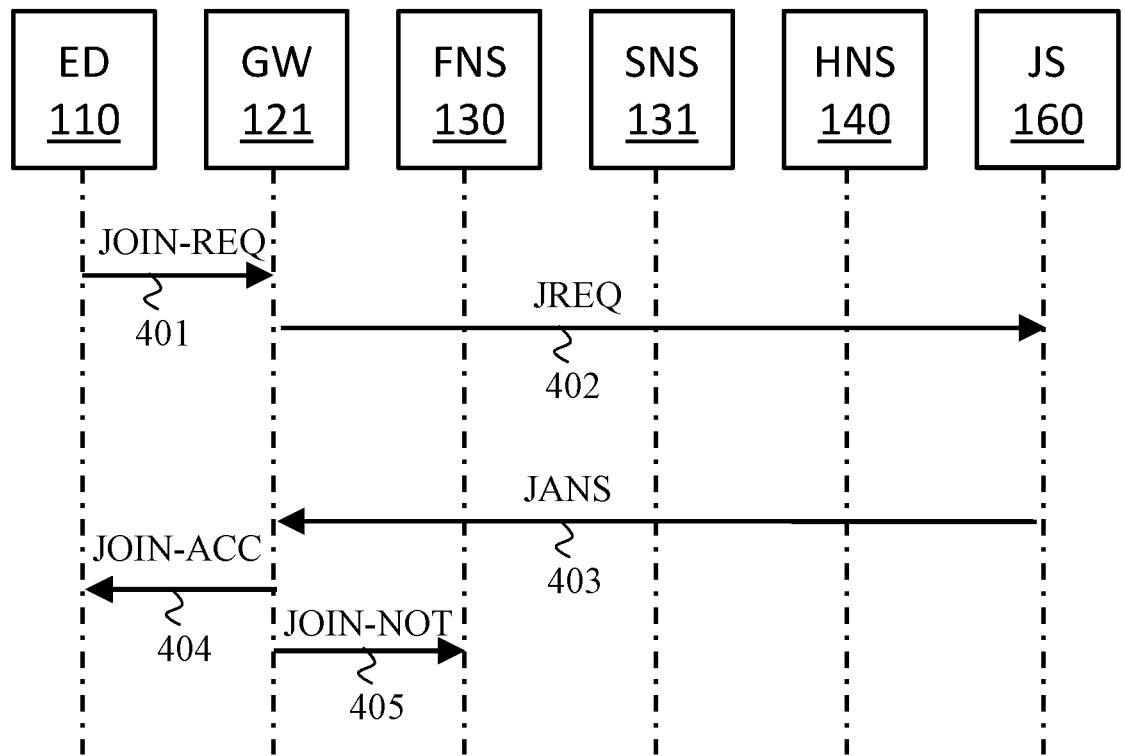
FIG. 4 illustrates schematically message exchanges taking place in the communication system of the Internet of Things of FIG. 3.

FIG. 4 illustrates schematically message exchanges taking place in the communication system of the Internet of Things of FIG. 3, when the end device 110 joins the communication system in handover roaming. These messages are exchanged in respective frames.

Figure 2:
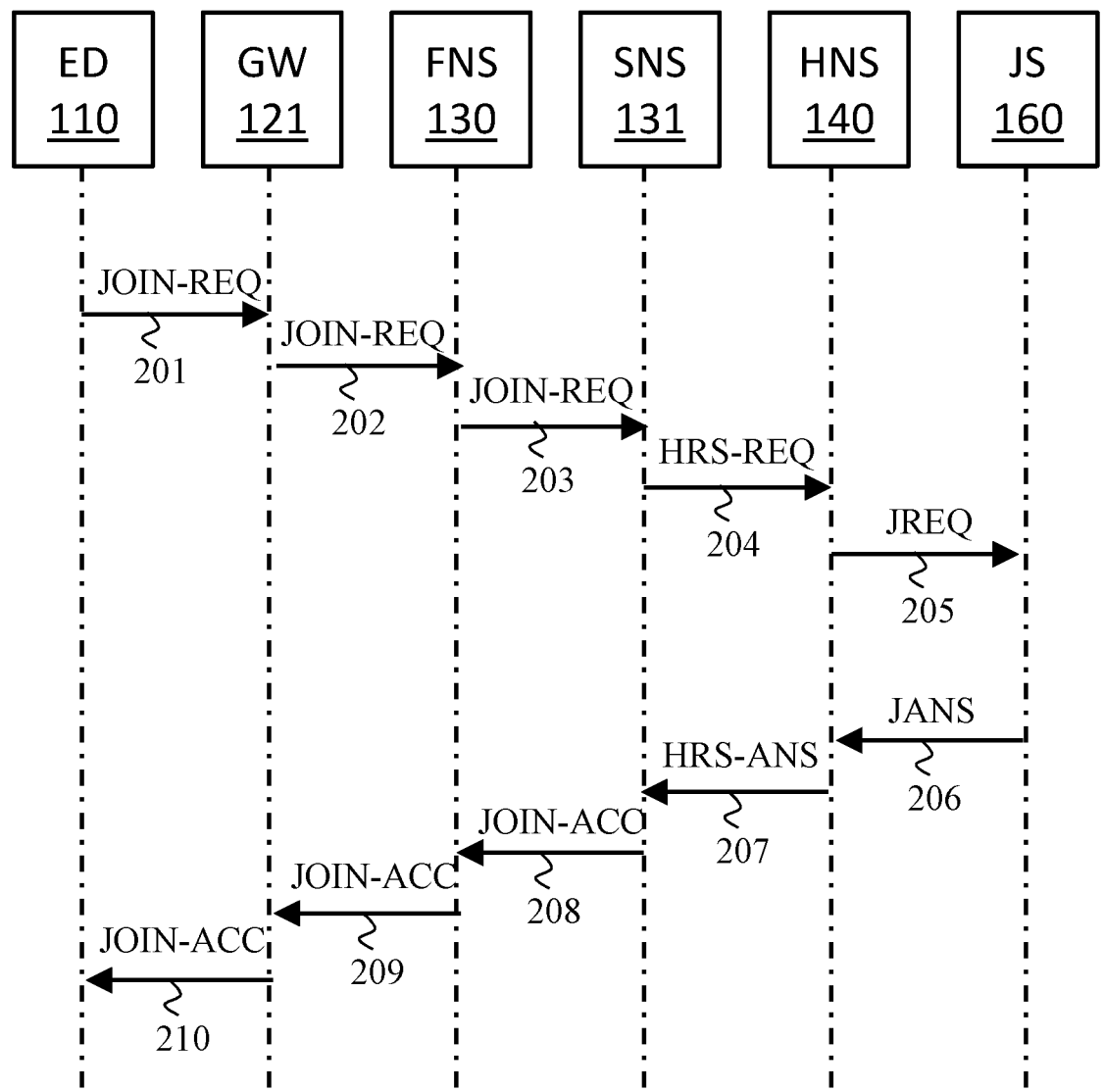
FIG. 2 illustrates schematically message exchanges taking place in the communication system of the Internet of Things of FIG. 1.

In a step 401, the end device 110 transmits a message JOIN-REQ via its radio interface. This step is identical to step 201 described in relation to FIG. 2. This JOIN-REQ message therefore includes a unique identifier of the end device 110, referred to as DevEUI in the LoRaWAN 1.1 specifications, as well as the unique identifier of the fifth JS server 160.

This JOIN-REQ message is captured by at least one gathering gateway 120, 121, 122. We shall consider that this JOIN-REQ message is captured by the gathering gateway 121. In a step 402, the gathering gateway 121 directly relays the message JOIN-REQ to the fifth JS server 160, in the form of a message JREQ as previously mentioned. The first FNS server 130, the second SNS server 131 and the third HNS server 140 are thus short-circuited. By virtue of the identifier that is contained in the JOIN-REQ message and which uniquely identifies the fifth JS server 160, the gathering gateway 121 detects that the end device 110 is roaming and that the core network of the second operator is responsible for checking that the end device 110 has a suitable subscription, and preferentially for authenticating the end device 110, that is to say confirming that the end device that transmitted the JOIN-REQ message is actually the end device 110 corresponding to the unique identifier supplied.

In the particular case of the message formats defined in the LoRaWAN 1.1 specifications, the JREQ message takes the form of a JoinReq message. The gathering gateway 121 copies, in a dedicated field of the JoinReq message, the unique identifier of the end device, referred to as DevEUI, that the roaming end device 110 entered in the Join-request message transmitted at step 401. In addition, the values of the MACversion, DLSettings and RxDelay fields are fixed at default values. It should be noted that the DLSettings and RxDelay values may be modified subsequently with the end device 110 by MAC command coming from the second SNS server 131, in order to adjust them to the actual requirements of the core network of the first operator.

On reception of the JREQ message, the fifth JS server 160 checks that the end device 110 has a suitable subscription for accessing the services of the fourth AS server 150 in handover roaming. Preferentially, the fifth JS server 160 carries out authentication of the end device 110. In a particular embodiment, in the case of a successful authentication, the fifth JS server 160 obtains (e.g. generates) the security keys necessary for the end device 110 to communicate in an encrypted manner in the communication system and to benefit from the services of the fourth AS server 150.

The fifth JS server 160 constructs a message JANS that includes a JOIN-ACC message to be relayed to the end device 110. When the subsequent communications with the terminal device 110 must be encrypted and the end device 110 is effectively authenticated by the fifth JS server 160, the JOIN-ACC message also includes the information enabling the end device 110 to obtain the security keys for protecting exchanges with the end device 110. The JOIN-ACC message preferentially also includes, in a form encrypted by a key known to the end device 110, the security key to be used for communicating with the fourth AS server 150. The latter security key is encrypted since it does not need to be known to the gathering gateways 120, 121, 122, or to the core network of the first operator. The JANS message can also include, otherwise than in the JOIN-ACC message, the security keys for protecting the exchanges with the end device 110 (with the exception therefore of the security key enabling the end device 110 to communicate with the fourth AS server 150). This simplifies recovery of the security keys by the gathering gateway to which the JANS message will be addressed.

When the message formats defined in the LoRaWAN 1.1 specifications are used, the fifth JS server 160 can modify the default values proposed in the MACversion, DLSettings and RxDelay fields of the JREQ message transmitted by the gathering gateway 121. This is in particular the case when the roaming agreements concluded between the first operator and the second operator define default values to be used and these default values are recorded in the memory of the fifth JS server 160 of the second operator without there being any need to enter them in the memory of the gathering gateways of the first operator. As already indicated, the DLSettings and RxDelay values may be modified subsequently with the end device 110 by MAC command coming from the second SNS server 131, in order to adjust them to the actual requirements of the core network of the first operator.

In a particular embodiment, in order to be able to communicate in the communication system, the end device 110 must be dynamically attributed an address, referred to as DevAddr in the LoRaWan 1.1 specifications. In the context of roaming in accordance with the architecture in FIG. 1, this address is attributed by the second SNS server 131. Here, as the second SNS server 131 is not involved in the relaying of the JOIN-REQ message, it is for the fifth JS server 160 to attribute this address. To do this, the management of a predetermined subset of the range of addresses of the first operator is solely entrusted to the fifth JS server 160 of the second operator in the context of the roaming agreement. "Provisioning" of addresses is spoken of. The fifth JS server 160 then attributes an address of said predetermined subset of the range of addresses of the first operator when said fifth JS server 160 successfully authenticates a roaming end device, and in the JOIN-ACC message indicates which address has thus been attributed. This provisioning of addresses can be configured with the second SNS server 131 and the fifth JS server 160 following the roaming agreement. In a variant, the range of addresses of the first operator the management of which is entrusted to the fifth JS server 160 of the second operator is negotiated by exchanges of messages between the second SNS server 131 and the fifth JS server 160.

The fifth JS server 160 must then distinguish the cases where said fifth JS server 160 must attribute an address (roaming end device) from the cases where said fifth JS server 160 must not attribute an address (end device that is not roaming). To do this, the format of the JREQ messages sent by the gathering gateways can be distinct from the format of the JREQ messages sent by the third HNS server 140, i.e. with a different format. A specific value of a JREQ message field may in a variant be reserved for the gathering gateways and prohibited to the third HNS server 140. In another variant, the fifth JS server 160 having knowledge of the address of the third HNS server 140, the fifth JS server 160 is capable of detecting that a JREQ message received comes from an item of equipment other than the third HNS server 140 and where applicable decides to attribute an address from among the provisioned addresses.

Next, in a step 403, the fifth JS server 160 transmits the JANS message in response to the JREQ message received at step 402. The fifth JS server 160 thus responds directly to the gathering gateway 121.

Then, in a step 404, the gathering gateway 121 relays by radio the JOIN-ACC message for the attention of the end device 110. The gathering gateway 121 recovers in the JOIN-ACC message the address attributed to the end device 110 by the fifth DNS server 160. The gathering gateway 121 also recovers, in the JANS message, where applicable, the security keys useful to the first core network. In a step 405, the gathering gateway 121 informs the core network of the first operator that the JOIN-ACC message has been transmitted to the end device 110. To do this, the gathering gateway 121 transmits to the first FNS server 130 a notification message JOIN-NOT including the unique identifier of the end device 110, as well as the address attributed by the fifth JS server 160 to the end device 110. The core network of the first network is thus informed of the presence of the roaming end device 110.

In the case where the subsequent communications with the end device 110 must be encrypted, the notification message JOIN-NOT includes the security keys recovered by the gathering gateway 121. This enables the core network of the first network to authenticate and decipher the communications of the end device 110 on behalf of the second operator in the context of handover roaming. It is the responsibility of the first FNS server 130 to track the appropriate information to the second SNS server 131 (not shown in FIG. 4). In the case where a delegation (as described below) is established, this also enables the core network of the first network to entrust the delegation to another gathering gateway.

In the case where the JOIN-REQ message is captured by at least one other gathering gateway among the gathering gateways 120, 122, each said other gathering gateway also relays the JOIN-REQ message to the fifth JS server 160, in the same way as described above vis-à-vis the gathering gateway 121. In the case of a Join-request message in accordance with the LoRaWAN 1.1 specifications, it is for example possible for the fifth JS server 160 to detect this situation by noting that the field "Nonce" has the same value in the various JOIN-REQ messages thus received. The fifth JS server 160 is then responsible for deduplicating the JOIN-REQ messages thus received and deciding to which gathering gateway to respond among the gathering gateways that relayed the JOIN-REQ message. In a particular embodiment, the fifth JS server 160 responds to the very first gathering gateway that relayed to it the JOIN-REQ message. In a variant, the fifth JS server 160 responds to a gathering gateway selected randomly among the gathering gateways that relayed the JOIN-REQ message. In another variant, each gathering gateway relaying the JOIN-REQ message indicates in association a received signal strength indicator (RSSI) coming from the end device 110, and the fifth JS server 160 responds to the gathering gateway that provides the best received signal strength indicator coming from the end device 110.

Thus, by providing the communications directly between the gathering gateways 120, 121, 122 of the first operator and the fifth JS server 160 of the second operator, the latency between the transmission of the JOIN-REQ message by the roaming end device 110 and the reception of the JOIN-ACC message by said end device 110 is reduced.

When the end device 110 has received the JOIN-ACC message that confirms that the authentication has succeeded, the end device 110 has joined the communication system. The end device 110 is then enabled to make uplink communications to the fourth AS server 150 and to receive downlink communications from the core network. The communications between the end device 110 and the fourth AS server 150 are carried out by successive relayings from the first FNS 130, second SNS 131 and third HNS 140 servers to the fourth AS server 150.

When the communications are encrypted, the uplink communications are authenticated by the core network of the first network by means of the security keys supplied by the fifth JS server 160, typically by the second SNS server 131 after relaying by the first FNS server 130. The content of the uplink communications is then relayed by the second SNS server 131 to the third HNS server 140, which next relays said content to the fourth AS server 150 for application processing. Responsible for the management of the MAC layer, the second SNS server 131 provides the acknowledgement of the uplink frames coming from the roaming end device 110 and relays, to said end device 110, the data received coming from the fourth AS server 150 for the attention of said roaming end device 110 and, where applicable, encrypts the downlink frames.

The questions of latency are less preponderant in the case of the processing of said uplink frames since there is no action by the fifth JS server 160, the processing operations of which, in particular for authenticating and obtaining the security keys, have a significant impact at the moment when the end device joins the communication system. A particular embodiment does however also make it possible to improve the latency in the context of the processing of the uplink frames and the management of the downlink frames. The management of the acknowledgements of the uplink frames is then in particular entrusted to a gathering gateway. "Delegation" is then spoken of. This approach by delegation is particularly advantageous in the case of end devices that listen on the communication medium mainly during the reception windows defined according to the instants of transmission of their uplink frames, that is to say the "Class A" and "Class B" end devices in the LoRaWAN 1.1 specifications. This aspect is detailed hereinafter in relation to FIGS. 6 to 8.

Figure 5:
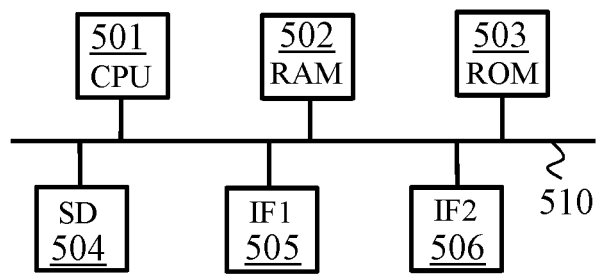
FIG. 5 illustrates schematically a hardware architecture of a communication device in the communication system of the Internet of Things of FIG. 3.

FIG. 5 illustrates schematically an example of hardware architecture of a communication device of the communication system in FIG. 3. Each end device and/or each gathering gateway and/or each core-network server can be constructed on the basis of such a hardware architecture.

The communication device comprises, connected by a communication bus 510: a processor or CPU (central processing unit) 501; a random access memory RAM 502; a read only memory ROM 503; a storage unit or a storage medium reader, such as an SD (Secure Digital) card reader 504 or a hard disk drive HDD; a communication interface IF1 505, and optionally another communication interface IF2 506.

When the communication device in FIG. 5 represents an end device, the communication interface IF1 505 is configured to enable said end device to communicate with gathering gateways.

When the communication device in FIG. 5 represents a gathering gateway, the communication interface IF1 505 is configured to enable said gathering gateway to communicate with end devices, and the other communication interface IF2 506 is configured to enable said gathering gateway to communicate with core-network servers.

When the communication device in FIG. 5 represents a core-network server, the communication interface IF1 505 is configured to enable said core-network server to communicate with at least one other core-network server and optionally with gathering gateways in a way that is compatible with the communication interface IF2 506 of the gathering gateways. The communication interfaces IF1 505 and IF2 506 may in this case be physical interfaces or logic interfaces.

The processor 501 is capable of executing instructions loaded into the RAM memory 502 from the ROM memory 503, from an external memory, from a storage medium, or from a communication network. When the communication device in question is powered up, the processor 501 is capable of reading instructions from the RAM memory 502 and executing them. These instructions form a computer program causing the implementation, by the processor 501, of all or some of the algorithms and steps described here in relation to the communication device in question.

Thus all or some of the algorithms and steps described here can be implemented in software form by the execution of a set of instructions by a programmable machine, such as a DSP (digital signal processor) or a microcontroller. All or some of the algorithms and steps described here may also be implemented in hardware form by a machine or a dedicated component, such as an FPGA (field-programmable gate array) or an ASIC (application-specific integrated circuit). In general terms, the communication device in question comprises electronic circuitry suitable and configured for implementing the algorithms and steps described here in relation to the communication device in question.

Figure 6:
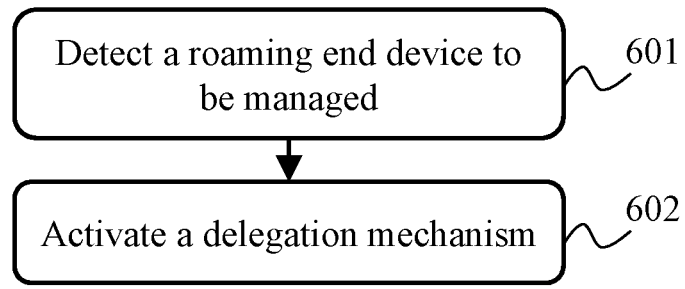
FIG. 6 illustrates schematically a delegation-activation algorithm.

FIG. 6 illustrates schematically an algorithm for activating delegation vis-à-vis a roaming end device, in a particular embodiment. The algorithm in FIG. 6 is implemented by each gathering gateway 120, 121, 122. We shall consider here by way of illustration that the algorithm in FIG. 6 is implemented by the gathering gateway 120.

In a step 601, the gathering gateway 120 detects a roaming end device to be managed. This is the case when the gathering gateway 120 has transmitted a message JREQ to the fifth JS server 160 for said roaming end device and in return has received a message JANS from the fifth JS server 160. An "elected gathering gateway" can then be spoken of since it has been selected, here by the fifth JS server 160, for establishing the delegation. Another case arises when the first FNS server 130 subsequently decides to entrust the delegation to another gathering gateway, in which case the first FNS server 130 informs the gathering gateway to which the delegation was entrusted up until then of this, awaits acknowledgement thereof, and sends to this other gathering gateway an instruction to activate the delegation for said roaming end device. This is because the delegation vis-à-vis an end device can be entrusted only to a single gathering gateway at any one time, in order to avoid any conflict of uplink-frame acknowledgement.

In a step 602, the gathering gateway 120 internally activates the delegation for the roaming end device in question. The gathering gateway 120 thus keeps track of having to acknowledge, on behalf of the core network of the first network, the uplink frames received from said roaming end device.

In the context of the activation of the delegation, the gathering gateway 120 initialises a buffer dedicated to the downlink transmissions intended for the end device in question. This buffer is therefore allocated to the roaming end device and makes it possible to make asynchronous, from the point of view of the core network, the downlink transmissions intended for said roaming end device with respect to the uplink transmissions coming from said roaming end device. In the case where the first FNS server 130 seeks to entrust the delegation to another gathering gateway, the gathering gateway 120 checks whether the buffer associated with the delegation in question is empty or not. In other words, the gathering gateway 120 checks whether useful data for the attention of the roaming end device in question are still awaiting transmission. If the buffer is empty, the gathering gateway 120 is enabled to deactivate the delegation and to send an acknowledgement to the first FNS server 130; otherwise the gathering gateway 120 must continue to acknowledge the uplink frames coming from said roaming end device until the buffer becomes empty. Once the buffer is empty, the gathering gateway 120 stops acknowledging the uplink frames coming from said roaming end device, transmits the acknowledgement to the first FNS server 130, and releases the buffer that was allocated to the delegation in question. In some embodiments, uplink-frame counters are maintained by the end devices and downlink-frame counters are maintained by the core network. The current values of these counters are indicated respectively in dedicated fields of the uplink frames and downlink frames. In the case of a delegation, the downlink-frame counter associated with the roaming end device to which the delegation applies is maintained by the elected gathering gateway. Then, in the acknowledgement transmitted to the first FNS server 130, the gathering gateway 120 includes the value of the downlink-frame counter. The first FNS server 130 informs the other gathering gateway to which the delegation is entrusted of this, so that this other gathering gateway can ensure continuity of the counting of the downlink frames. This ensures that the delegation remains transparent for said roaming end device.

Figure 7:
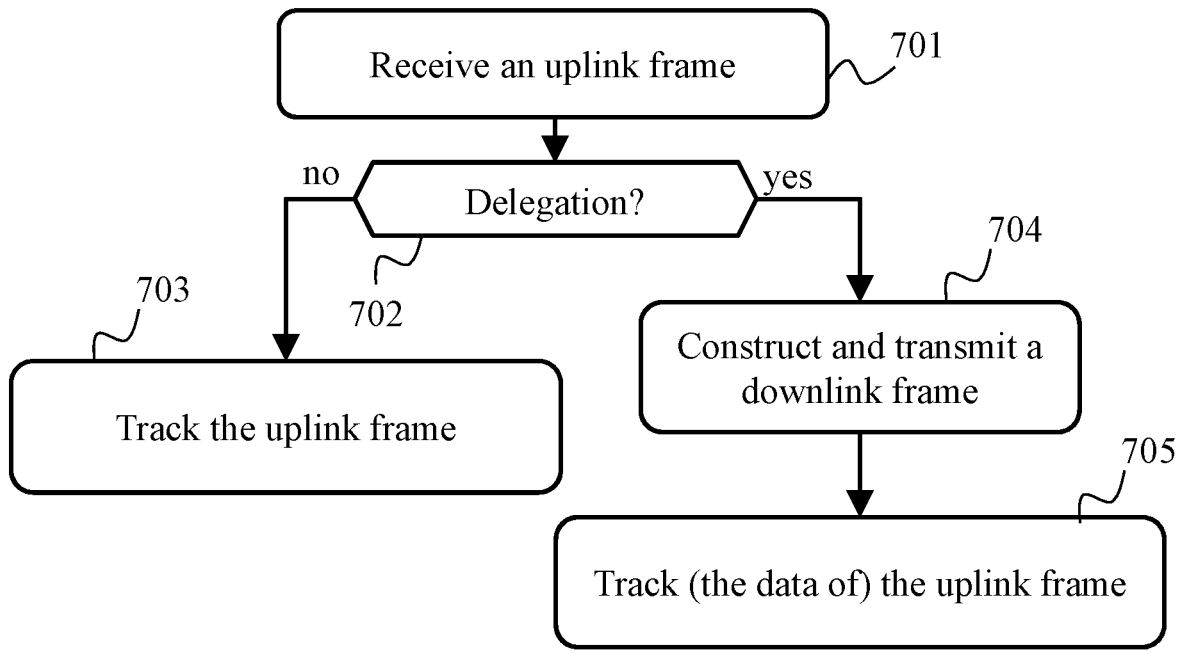
FIG. 7 illustrates schematically an algorithm for processing an uplink frame.

FIG. 7 illustrates schematically an algorithm for processing uplink frames. The algorithm in FIG. 7 is implemented by each gathering gateway 120, 121, 122, in a particular embodiment. We shall consider by way of illustration that the algorithm in FIG. 7 is implemented by the gathering gateway 120.

In a step 701, the gathering gateway 120 receives an uplink frame coming from an end device. The uplink frame specifies the address of the end device from which said uplink frame comes.

In a step 702, the gathering gateway 120 checks whether the end device is a roaming end device for which the delegation was activated with the gathering gateway 120. If such is the case, a step 704 is performed; otherwise a step 703 is performed.

In step 703, the gathering gateway 120 tracks the uplink frame to the core network, namely to the first FNS server 130, so that said uplink frame can arrive at the fourth AS server 150 so as to process the applicative content thereof. The gathering gateway 120 here serves simply as a relay and temporarily keeps track of the fact that feedback is expected from the core network vis-à-vis said uplink frame, at least to acknowledge said uplink frame and optionally to provide supplementary useful data.

The gathering gateway 120 keeps track of the reception of said uplink frame and of the instant at which said uplink frame was received, so as to be able subsequently to determine at what moment to transmit in response a downlink frame comprising, at least, an acknowledgement of said uplink frame. When the gathering gateway 120 subsequently receives from the core network the downlink frame to be tracked to the end device in question in response to said uplink frame, the core network supplies time information representing a duration and the gathering gateway 120 adds said duration to the instant at which said uplink frame was received, in order to determine at which moment to transmit said downlink frame.

In a variant, the gathering gateway 120 schedules at least one reception window for said end device, in which the gathering gateway 120 is supposed to relay a downlink frame that will subsequently be supplied by the core network. The gathering gateway 120 then monitors that it receives a downlink frame to be tracked to the end device in question in response to said uplink frame within an appropriate time for meeting a said reception window thus scheduled.

In step 704, the gathering gateway 120 must, on behalf of the core network, acknowledge the uplink frame received at step 701. This means that the end device concerned is roaming and that the gathering gateway 120 has delegation for anticipating the acknowledgements intended for said end device. When the acknowledgement must be done in a said reception window defined according to an instant of transmission of said uplink frame, the gathering gateway 120 ensures that said end device is listening on the communication medium. The gathering gateway 120 checks whether the buffer associated with said end device contains useful data supplied by the core network for the attention of said end device. If the buffer does not contain such useful data, the gathering gateway 120 constructs a downlink frame including the aforementioned acknowledgement and transmits the downlink frame thus constructed to said end device at the opportune moment. Otherwise the gathering gateway 120 constructs a downlink frame including the aforementioned acknowledgement and including also data stored in the buffer. These data are then deleted from the buffer, and the gathering gateway 120 transmits the downlink frame thus constructed to said end device at the opportune moment, and step 705 is next performed.

In the particular embodiment where the communications with the end device in question are encrypted, the gathering gateway 120 authenticates the end device by decoding an integrity code included in the uplink frame received at step 701 by means of the security keys associated with said end device. This integrity code is called MIC (Message Integrity Code) in the LoRaWAN 1.1 specifications. If the authentication fails, the gathering gateway 120 discards the uplink frame and interrupts the execution of the algorithm in FIG. 7. In addition, when the gathering gateway 120 must encrypt the downlink frame constructed, the gathering gateway 120 uses the security keys associated with said roaming end device in order to encrypt said downlink frame, before transmitting said downlink frame in encrypted form. The downlink frame in encrypted form then also includes an integrity code authenticating the core network, on behalf of which the gathering gateway 120 acts.

In step 705, the gathering gateway 120 tracks to the core network the uplink frame or the data contained in the uplink frame, so that said uplink frame can arrive at the fourth AS server 150 in order to process the content thereof. The gathering gateway 120 can also solely relay the data without delegation. Data without delegation means the data that do not relate to a functionality delegated to the gathering gateway 120. The gathering gateway 120 may thus for example not propagate the integrity code contained in the uplink frame received from said roaming end device. These data may be encrypted by the gathering gateway 120 by means of a security key known also to the first FNS server 130, for example using a secure tunnel.

It is noted, in the light of the algorithm in FIG. 7, that the data contained in an uplink frame may be relayed by a plurality of gathering gateways that would capture the uplink frame in question. It is then the responsibility of the first FNS server 130 to carry out any appropriate deduplication of data.

Figure 8:
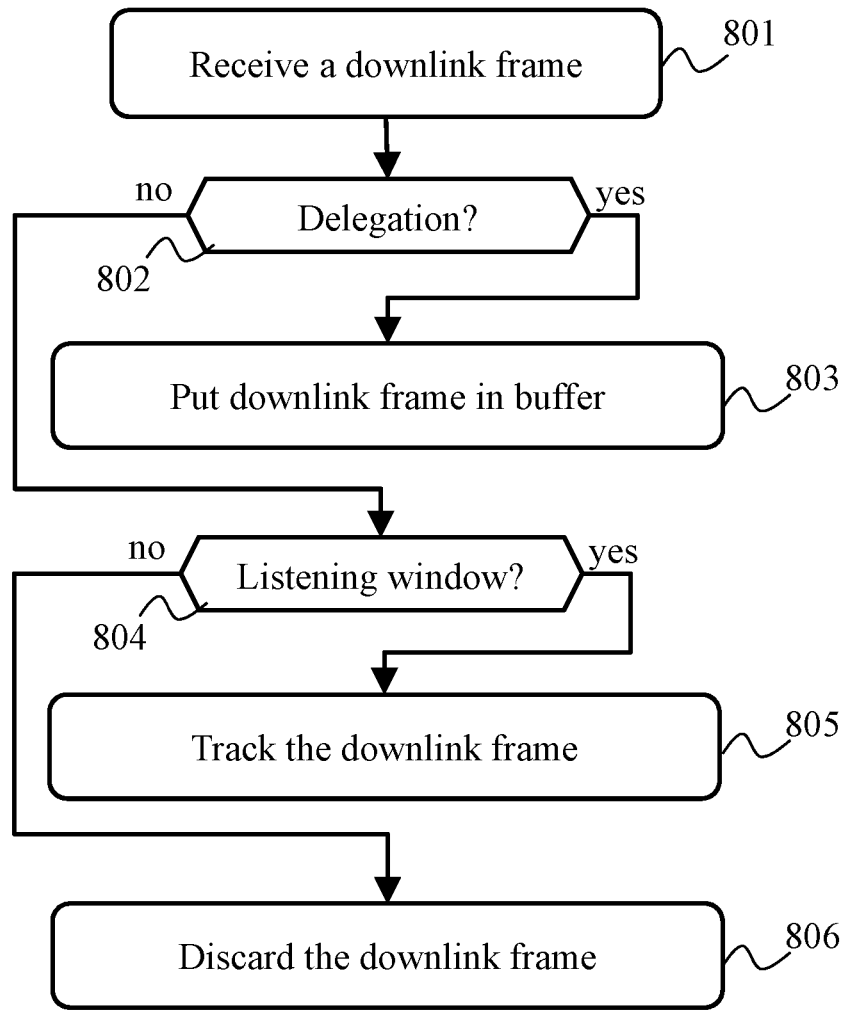
FIG. 8 illustrates schematically an algorithm for processing a downlink frame.

FIG. 8 illustrates schematically an algorithm for processing downlink frames. The algorithm in FIG. 8 is implemented by each gathering gateway 120, 121, 122. We shall consider by way of illustration that the algorithm in FIG. 8 is implemented by the gathering gateway 120.

In a step 801, the gathering gateway 120 receives a downlink frame coming from the core network. The downlink frame specifies the address of the end device for which said downlink frame is intended.

In a step 802, the gathering gateway 120 checks whether or not the delegation has been activated vis-à-vis said end device (in which case the end device in question is roaming). If such is the case, a step 803 is performed; otherwise a step 804 is performed.

In step 803, the gathering gateway 120 puts the data contained in the downlink frame received at step 801 in the buffer associated with the roaming end device for which said data are intended. "Useful data" can then be spoken of, for the attention of said roaming end device. The downlink frame received at step 801 then typically has a format other than the downlink frames transmitted by the first FNS server 130 when the delegation mechanism is not activated, since at least the acknowledgements are not managed by the core network when the delegation mechanism is activated. The gathering gateway 120 will subsequently send the useful data thus received from the core network for the attention of the end device in question, when a reception window will so permit, more particularly in response to a next uplink transmission by said roaming end device.

In step 804, the gathering gateway 120 must provide the relaying of the downlink frame received at step 801. Since the delegation is not activated, the gathering gateway 120 can effect the relaying to the end device in question only if there remains at least one reception window to come according to the uplink frame that triggered the sending of said downlink frame by the core network. In other words, the gathering gateway 120 checks whether said gathering gateway 120 had kept track of the fact that a return was expected from the core network vis-à-vis an uplink frame previously received from said end device. If such is the case, a step 805 is performed; otherwise a step 806 is performed.

In step 805, the gathering gateway 120 tracks the downlink frame received at step 801 in a said reception window defined according to an instant of transmission of the uplink frame that triggered the sending of said downlink frame by the core network.

In step 806, the gathering gateway 120 is out of time for being able to relay the downlink frame to the end device in question. The gathering gateway 120 therefore discards the downlink frame. It is then the responsibility of the core network to subsequently retransmit the useful data that were contained in said downlink frame.

It will also be seen from the above that transferring some of the control functionalities of the MAC layer of the SNS server 131 to the gathering gateways 120, 121, 122 constitutes a significant improvement in terms of latency in situations of handover roaming in a context of interconnected LPWAN communication networks.

It can also be seen from the above that, although it is not necessary to implement the message formats defined in the LoRaWAN protocol in order to benefit from the advantages of the invention, the devices and methods described are broadly compatible with the LoRaWAN 1.1 specifications and constitute a significant improvement thereto in terms of latency.

The invention claimed is:

1. A method for managing handover roaming in a communication system comprising a first LPWAN network of a first operator and a second LPWAN network of a second operator, the first network comprising:
   gathering gateways,
   a first server responsible for managing said gathering gateways, and
   a second server, coupled to the first server, responsible for controlling the MAC layer for end devices communicating via said gathering gateways,
   the second network comprising:
   a third server responsible for interfacing a fourth server and a fifth server with the second server of the first network,
   the fourth server, which implements an application with which at least one end device of the second operator exchanges application data in the context of a defined service subscription with the second operator, and
   the fifth server, responsible for authenticating any end device seeking to join the communication system in order to benefit from the services of the fourth server,
   wherein the communication system transports uplink frames including application data from said at least one end device of the second operator to the fourth server by successive relayings of the first, second and third servers when said at least one end device of the second operator is authenticated and furthermore said uplink frames are captured by at least one gathering gateway of the first network,
   wherein each gathering gateway of the first network, which has detected an end device of the second operator requesting to join the communication system in order to benefit from the services of the fourth server, directly communicates with the fifth server in order to authenticate said end device of the second operator detected, thereby short-circuiting the first, second and third servers; and
   wherein, the first network having a range of addresses for all the end devices accessing the communication system via the gathering gateways of the first network, the fifth server manages a predetermined subset of addresses of the range of addresses of the first network and attributes an address from among said predetermined subset of addresses to any end device of the second operator that is in handover roaming via the first network and is authenticated by the fifth server.

2. The method according to claim 1, wherein the communications with each authenticated end device of the second operator being encrypted, the fifth server supplies the security keys necessary for said encrypted communications and, when a gathering gateway of the first network receives a message from the fifth server indicating that an end device of the second operator has been successfully authenticated and including said security keys, said gathering gateway of the first network relays the security keys to the first server.

3. The method according to claim 2, wherein the first server relays the security keys to the second server.

4. The method according to claim 1, wherein in order to request to join the communication system in order to benefit from the services of the fourth server, each end device of the second operator sends a message including an identifier that uniquely identifies the fifth server, and wherein each gathering gateway of the first network capturing said message determines at which address to contact the fifth server by means of an association previously stored in memory between said identifier and the address for contacting the fifth server.

5. The method according to claim 4, wherein on configuration of each gathering gateway of the first network with the identifier that uniquely identifies the fifth server, said gathering gateway of the first network requests a sixth server, responsible for effecting resolutions of domain names, to supply the address for contacting the fifth server by means of said identifier that uniquely identifies the fifth server.

6. The method according to claim 5, wherein on configuration of the first server with the identifier that uniquely identifies the fifth server, the first server requests a sixth server, responsible for effecting resolutions of domain names, to supply the address for contacting the fifth server by means of said identifier that uniquely identifies the fifth server, and the first server propagates an association of said identifier and said address with each gathering gateway of the first network.

7. The method according to claim 1, wherein when the fifth server receives a plurality of copies of the same message that emanates from an end device of the second operator and which requests to join the communication system, the fifth server effects a deduplication of data and responds to the first copy in sequence of said message.

8. The method according to claim 1, wherein when a gathering gateway of the first network receives a message from the fifth server indicating that an end device of the second operator has been successfully authenticated, said gathering gateway of the first network activates a delegation and notifies the first server accordingly, the delegation comprising the following steps:
   allocating a buffer to said end device of the second operator and storing therein useful data subsequently received asynchronously via the first server for the attention of said end device of the second operator; and
   acknowledging any uplink frame subsequently received from said end device of the second operator by constructing and transmitting, on behalf of the second server, downlink frames including respective acknowledgements of said uplink frames and, where applicable, including useful data stored in the buffer allocated to said end device of the second operator; and
   relaying the uplink frame to the first server;
   and, on reception of a downlink frame for the attention of said end device of the second operator:
   placing the useful data, supplied in the downlink frame, in the buffer allocated to said end device of the second operator.

9. The method according to claim 8, wherein each gathering gateway of the first network that receives, coming from the first server, an instruction to deactivate the delegation vis-à-vis an end device of the second operator performs the following steps:
   if the buffer allocated to the end device of the second operator is empty, confirming with the first server that said gathering gateway of the first network has deactivated the delegation vis-à-vis said end device of the second operator;
   if the buffer allocated to said end device of the second operator is not empty, maintaining the delegation until said buffer is emptied by construction and transmission of said downlink frames by said gathering gateway of the first network.

10. The method according to claim 8, wherein each gathering gateway of the first network that has activated the delegation vis-à-vis an end device of the second operator increments a value of a downlink-frame counter as said downlink frames are constructed for the attention of said end device of the second operator and includes, in said downlink frames, the incremented value of the downlink-frame counter,
   and, when said gathering gateway of the first network deactivates the delegation, said gathering gateway of the first network notifies to the first server an up-to-date value of the downlink frame counter.

11. A communication system comprising a first LPWAN network of a first operator and a second LPWAN network of a second operator, the first network comprising:
   gathering gateways,
   a first server responsible for managing said gathering gateways, and
   a second server, coupled to the first server, responsible for controlling the MAC layer for end devices communicating via said gathering gateways,
   the second network comprising:
   a third server responsible for interfacing a fourth server and a fifth server with the second server of the first network,
   the fourth server, which implements an application with which at least one end device of the second operator exchanges application data in the context of a service subscription defined with the second operator, and
   the fifth server, responsible for authenticating any end device seeking to join the communication system in order to benefit from the services of the fourth server,
   the communication system being arranged, in the context of a management of handover roaming between the first network and the second network, to transport uplink frames including application data from said at least one end device of the second operator to the fourth server by successive relaying s of the first, second and third servers when said at least one end device of the second operator is authenticated and furthermore when said uplink frames are captured by at least one gathering gateway of the first network,
   the communication system wherein each gathering gateway of the first network, which has detected an end device of the second operator requesting to join the communication system in order to benefit from the services of the fourth server is arranged to directly communicate with the fifth server in order to authenticate said end device of the second operator detected, thereby short-circuiting the first, second and third servers; and wherein, the first network having a range of addresses for all the end devices accessing the communication system via the gathering gateways of the first network, the fifth server is arranged to manage a predetermined subset of addresses in the range of addresses of the first network and attributes an address from said predetermined subset of addresses to any end device of the second operator that is in handover roaming via the first network and which is authenticated by the fifth server.

12. A method for managing handover roaming in a communication system comprising a first LPWAN network of a first operator and a second LPWAN network of a second operator, the first network comprising:

gathering gateways, a first server responsible for managing said gathering gateways, and a second server, coupled to the first server, responsible for controlling the MAC layer for end devices communicating via said gathering gateways, the second network comprising:

a third server responsible for interfacing a fourth server and a fifth server with the second server of the first network, the fourth server, which implements an application with which at least one end device of the second operator exchanges application data in the context of a defined service subscription with the second operator, and the fifth server, responsible for authenticating any end device seeking to join the communication system in order to benefit from the services of the fourth server, wherein the communication system transports uplink frames including application data from said at least one end device of the second operator to the fourth server by successive relayings of the first, second and third servers when said at least one end device of the second operator is authenticated and furthermore said uplink frames are captured by at least one gathering gateway of the first network, wherein each gathering gateway of the first network that has detected an end device of the second operator requesting to join the communication system in order to benefit from the services of the fourth server communicates with the fifth server in order to authenticate said end device of the second operator detected, short-circuiting the first, second and third servers;

wherein the first network having a range of addresses for all the end devices accessing the communication system via the gathering gateways of the first network, the fifth server manages a predetermined subset of addresses of the range of addresses of the first network and attributes an address from among said predetermined subset of addresses to any end device of the second operator that is in handover roaming via the first network and is authenticated by the fifth server, wherein when a gathering gateway of the first network receives a message from the fifth server indicating that an end device of the second operator has been successfully authenticated, said gathering gateway of the first network activates a delegation and notifies the first server accordingly, the delegation comprising the following steps:

allocating a buffer to said end device of the second operator and storing therein useful data subsequently received asynchronously via the first server for the attention of said end device of the second operator; and acknowledging any uplink frame subsequently received from said end device of the second operator by constructing and transmitting, on behalf of the second server, downlink frames including respective acknowledgements of said uplink frames and, where applicable, including useful data stored in the buffer allocated to said end device of the second operator; and relaying the uplink frame to the first server;

and, on reception of a downlink frame for the attention of said end device of the second operator:

placing the useful data, supplied in the downlink frame, in the buffer allocated to said end device of the second operator.

* * * * *